United States Patent
Jeol et al.

(10) Patent No.: US 12,473,401 B2
(45) Date of Patent: Nov. 18, 2025

(54) POLYAMIDES AND CORRESPONDING POLYMER COMPOSITIONS AND ARTICLES

(71) Applicant: Syensqo Specialty Polymers USA, LLC, Alpharetta, GA (US)

(72) Inventors: Stéphane Jeol, Saint-Genis-Laval (FR); Joel Flores, Alpharetta, GA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 995 days.

(21) Appl. No.: 17/598,925

(22) PCT Filed: Apr. 1, 2020

(86) PCT No.: PCT/EP2020/059209
§ 371 (c)(1),
(2) Date: Sep. 28, 2021

(87) PCT Pub. No.: WO2020/201327
PCT Pub. Date: Oct. 8, 2020

(65) Prior Publication Data
US 2022/0195116 A1    Jun. 23, 2022

Related U.S. Application Data

(60) Provisional application No. 62/828,809, filed on Apr. 3, 2019.

Foreign Application Priority Data

Sep. 23, 2019   (EP) ..................................... 19198868

(51) Int. Cl.
*C08G 69/36*     (2006.01)
*C08J 5/04*     (2006.01)
(Continued)

(52) U.S. Cl.
CPC .............. *C08G 69/36* (2013.01); *C08J 5/043* (2013.01); *C08K 7/14* (2013.01); *C09D 7/70* (2018.01);
(Continued)

(58) Field of Classification Search
CPC ....... C08G 69/36; C08J 5/043; C08J 2377/06; C08K 7/14; C08K 2201/004; C09D 7/70; C09D 177/06
See application file for complete search history.

(56) References Cited

U.S. PATENT DOCUMENTS 2,910,457 A    10/1959   Temin et al.
3,037,002 A    5/1962   Pietrusza et al.
(Continued)

FOREIGN PATENT DOCUMENTS

GB    1129074 A    10/1968
GB    1202659 A    8/1970
GB    1224857 A    3/1971

OTHER PUBLICATIONS

Murphy J., in "Additives for Plastics Handbook", 2nd Edition, 2001, Chapter 5.2.3., p. 43-48—Elsevier Advanced Technology.
(Continued)

*Primary Examiner* — Angela C Scott
(74) *Attorney, Agent, or Firm* — Osha Bergman Watanabe & Burton LLP

(57) ABSTRACT

The present invention relates to a polyamide (PA) comprising recurring units X, Y, and Z and is represented by the following formula (1): wherein—$n_x$, $n_y$ and $n_z$ are respectively the mole percent (mol. %) of each recurring units X, Y and Z; —10 mol % ≤ $n_x$ ≤ 90 mol %; —0 mol % ≤ $n_y$ ≤ 90 mol %; —0 mol % ≤ $n_z$ ≤ 90 mol %; —$n_x+n_y+n_z$ ≤ 100 mol. %; and—at least one of $n_y$ and $n_z$ is greater than 0 mol. %, and wherein—$R_1$ is selected from the group consisting of a hydrogen, an alkyl, or an aryl—R'i, at each location, is independently selected from the group consisting of an alkyl, an aryl, an alkali or alkaline earth metal sulfonate, an alkyl sulfonate, and a quaternary ammonium; —i is an integer from 0 to 10; —$R_2$ is selected from the group consisting of a bond, a $C_1$-$C_{15}$ alkyl and a $C_6$-$C_{30}$ aryl, optionally comprising one or more heteroatoms (e.g. O, N or S) and optionally substituted with one or more substituents selected from the group consisting of halogen, hydroxy (—OH), sulfo (—$SO_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; —$R_3$ is selected from the group consisting of a $C_1$-$C_{20}$ alkyl, a phenyl, an indanyl, and a napthyl, optionally comprising one or more heteroatoms (e.g. O, N or S) and optionally substituted with one or more substituents selected from the group consisting of halogen, hydroxy (—OH), sulfo (—$SO_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; and—$R_4$ is selected from the group consisting of a linear or branched $C_6$-$C_{14}$ alkyl, optionally comprising one or more heteroatoms (e.g. O, N or S) and optionally substituted with one or more substituents selected from the group consisting of a halogen, hydroxy (—OH), sulfo (—$SO_3$M), $C_1$-$C_6$ alkoxy, $C_1$-$C_6$ alkylthio, $C_1$-$C_6$ acyl, formyl, cyano, and $C_6$-$C_{15}$ aryloxy and $C_6$-$C_{15}$ aryl; and—M in each of $R_2$ to $R_4$ is independently selected from the group consisting of H, Na, K, Li, Ag, Zn, Mg and Ca; with the provisios that—if recurring unit Y is formed from the condensation of p-xylylene diamine and a C12 dicarboxylic acid then: —30 mol % ≤ $n_x$ ≤ 90 mol %; —0 mol % ≤ $n_y$ ≤ 70 mol %; and—0 mol % ≤ $n_z$ ≤ 70 mol %; —$n_x+n_y+n_z$ ≤ 100 mol. %; and—If recurring unit Y is formed from the condensation of terephthalic acid with a diamine, $R_2$ is selected from the group consisting of a bond, a $C_1$-$C_9$ alkyl, a $C_{11}$-$C_{15}$ alkyl, and a $C_6$-$C_{30}$ aryl, optionally comprising one or more heteroatoms (e.g. O, N or S) and optionally substituted with one or more substituents selected from the group consisting of halogen, hydroxy
(Continued)

(—OH), sulfo (—SO$_3$M), C$_1$-C$_6$ alkoxy, C$_1$-C$_6$ alkylthio, C$_1$-C$_6$ acyl, formyl, cyano, C$_6$-C$_{15}$ aryloxy and C$_6$-C$_{15}$ aryl.

14 Claims, No Drawings

(51) Int. Cl.
  *C08K 7/14* (2006.01)
  *C09D 7/40* (2018.01)
  *C09D 177/06* (2006.01)
(52) U.S. Cl.
  CPC ......... *C09D 177/06* (2013.01); *C08J 2377/06* (2013.01); *C08K 2201/004* (2013.01)

(56) References Cited

U.S. PATENT DOCUMENTS

| | | |
|---|---|---|
| 3,396,151 A | 8/1968 | Caldwell |
| 3,419,636 A | 12/1968 | Pietrusza et al. |
| 3,509,105 A | 4/1970 | Pedersen |
| 3,600,363 A | 8/1971 | Shigeyuki et al. |
| 3,711,537 A | 1/1973 | Asano et al. |
| 4,844,834 A | 7/1989 | Dellinger |
| 2012/0048598 A1* | 3/2012 | Kaimori ................ H05K 3/386 |
| | | 524/80 |
| 2015/0020871 A1 | 1/2015 | Meunier et al. |
| 2015/0175804 A1* | 6/2015 | Aepli .................... C08K 5/5313 |
| | | 524/100 |

OTHER PUBLICATIONS

Murthy N. S. et al., "Structure and properties of polyamide 6 and 4-aminomethylcyclohexane carboxylic acid copolymers with an unusually short helical pitch for nylons", Polymer, 2003, vol. 44, No. 18, pp. 5387-5396, Elsevier Science Publishers B.V, GB.

Levine, M. et al., "Isomorphous replacement in a copolyamide system", Journal of Polymer Science 1961, 49, 241-246.

Bogdanov, M. N. et al., "Synthesis of some polyamides on the basis of α,ω-w-amino carboxylic acids with benzene or cyclohexane rings in the methylene chains", Vysokomolekulyarnye Soedineniya, 1961, 3, 1326-1331.

Prince, F. R. et al., "Isomorphous replacement in Nylon 6 by 4-aminomethylcyclohexanecarboxylic acid", Journal of Polymer Science, Part A-1: Polymer Chemistry, 1970, 8(12), 3533-3541, John Wiley & Sons, Inc.

Y. Li et al., "Crystal Structure and Properties of N6/AMCC Copolymer from Theory and Fiber XRD", Macromolecules, 2003, 36(3), 900-907, American Chemical Society.

\* cited by examiner

POLYAMIDES AND CORRESPONDING POLYMER COMPOSITIONS AND ARTICLES

CROSS-REFERENCE TO RELATED APPLICATIONS

This application is a U.S. national stage entry under 35 U.S.C. § 371 of international patent application No. PCT/EP2020/059209 filed on Apr. 1, 2020, which claims priority to U.S. provisional patent application No. 62/828,809, filed on Apr. 3, 2019 and to European patent application No. 19198868.2 filed on Sep. 23, 2019, the whole content of each being explicitly incorporated herein by reference.

TECHNICAL FIELD

The present invention relates to a polyamide (PA) comprising recurring units X, Y, and Z and is represented by the following formula (1):

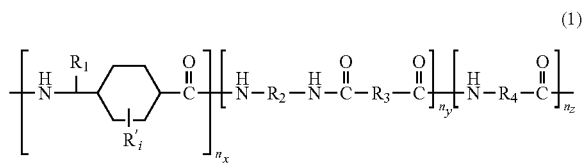

wherein
$n_x$, $n_y$ and $n_z$ are respectively the mole percent (mol. %) of each recurring units X, Y and Z;
10 mol % $\leq n_x \leq$ 90 mol %;
0 mol % $\leq n_y \leq$ 90 mol %;
0 mol % $\leq n_z \leq$ 90 mol %;
$n_x + n_y + n_z \leq$ 100 mol. %; and
at least one of $n_y$ and $n_z$ is greater than 0 mol. %, and
wherein
$R_1$ is selected from the group consisting of a hydrogen, an alkyl, or an aryl
$R'_i$, at each location, is independently selected from the group consisting of an alkyl, an aryl, an alkali or alkaline earth metal sulfonate, an alkyl sulfonate, and a quaternary ammonium;
i is an integer from 0 to 10;
$R_2$ is selected from the group consisting of a bond, a $C_1$-$C_{15}$ alkyl and a $C_6$-$C_{30}$ aryl, optionally comprising one or more heteroatoms (e.g. O, N or S) and optionally substituted with one or more substituents selected from the group consisting of halogen, hydroxy (—OH), sulfo (—SO$_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl;
$R_3$ is selected from the group consisting of a $C_1$-$C_{20}$ alkyl, a phenyl, an indanyl, and a napthyl, optionally comprising one or more heteroatoms (e.g. O, N or S) and optionally substituted with one or more substituents selected from the group consisting of halogen, hydroxy (—OH), sulfo (—SO$_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; and
$R_4$ is selected from the group consisting of a linear or branched $C_6$-$C_{14}$ alkyl, optionally comprising one or more heteroatoms (e.g. O, N or S) and optionally substituted with one or more substituents selected from the group consisting of a halogen, hydroxy (—OH), sulfo (—SO$_3$M), $C_1$-$C_6$ alkoxy, $C_1$-$C_6$ alkylthio, $C_1$-$C_6$ acyl, formyl, cyano, and $C_6$-$C_{15}$ aryloxy and $C_6$-$C_{15}$ aryl; and
M in each of $R_2$ to $R_4$ is independently selected from the group consisting of H, Na, K, Li, Ag, Zn, Mg and Ca;
with the provisios that
if recurring unit Y is formed from the condensation of p-xylylene diamine and a $C_{12}$ dicarboxylic acid then:
30 mol % $\leq n_x \leq$ 90 mol %;
0 mol % $\leq n_y \leq$ 70 mol %; and
0 mol % $\leq n_z \leq$ 70 mol %;
$n_x + n_y + n_z \leq$ 100 mol. %; and
If recurring unit Y is formed from the condensation of terephthalic acid with a diamine, $R_2$ is selected from the group consisting of a bond, a $C_1$-$C_9$ alkyl, a $C_{11}$-$C_{15}$ alkyl, and a $C_6$-$C_{30}$ aryl, optionally comprising one or more heteroatoms (e.g. O, N or S) and optionally substituted with one or more substituents selected from the group consisting of halogen, hydroxy (—OH), sulfo (—SO$_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl.

The present invention also relates to polymer compositions comprising such polyamides.

The present invention also relates to articles comprising such polymers and polymer compositions.

BACKGROUND ART

Cycloaliphatic polyamides are of significant interest, relative to their semi-aromatic counter parts, due to the increased tunability of the glass transition temperature ("Tg"). However, polyamide homopolymers formed from the polycondensation of, for example, 1,4-aminomethylcyclohexanecarboxylic acid, (1,4-AMCC), can have an extremely high melting temperature (e.g. 370° C.). Such polyamides cannot be desirably melt processed, due at least in part to decomposition of the polymer at melt processing temperatures and retention times.

In one approach to address the aforementioned problem, 1,4-AMCC is copolymerized with caprolactam (PA 1,4-AMCC/6), which can provide tunability of Tg and Tm. For example, the Tm of the copolymer can be from 290° C. to 300° C. Yet, due to the isomorphism of these copolyamides, increasing the Tg appreciably above 120° C. while maintaining the copolyamide melt processable and semi-crystalline is generally not possible due to the flexible PA6 recurring units. Also, due to the isomorphism, it is impossible to synthesize amorphous and high Tg copolyamides from reaction of only 1,4-AMCC and caprolactam. There is a need to develop copolyamides containing recurring units and that do not exhibit isomorphism, being melt processable and having improved Tg.

SUMMARY OF INVENTION

The present invention relates to a polyamide (PA) comprising recurring units X, Y, and Z and is represented by the following formula (1):

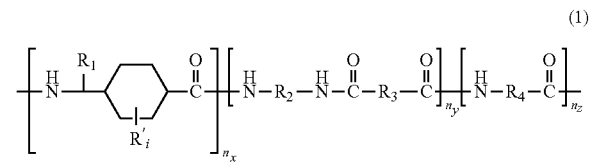

wherein
- $n_x$, $n_y$ and $n_z$ are respectively the mole percent (mol. %) of each recurring units X, Y and Z;
- 10 mol % ≤ $n_x$ ≤ 90 mol %;
- 0 mol % ≤ $n_y$ ≤ 90 mol %;
- 0 mol % ≤ $n_z$ ≤ 90 mol %;
- $n_x + n_y + n_z$ ≤ 100 mol. %; and
- at least one of $n_y$ and $n_z$ is greater than 0 mol. %, and wherein
- $R_1$ is selected from the group consisting of a hydrogen, an alkyl, or an aryl
- $R'_i$, at each location, is independently selected from the group consisting of an alkyl, an aryl, an alkali or alkaline earth metal sulfonate, an alkyl sulfonate, and a quaternary ammonium;
- i is an integer from 0 to 10;
- $R_2$ is selected from the group consisting of a bond, a $C_1$-$C_{15}$ alkyl and a $C_6$-$C_{30}$ aryl, optionally comprising one or more heteroatoms (e.g. O, N or S) and optionally substituted with one or more substituents selected from the group consisting of halogen, hydroxy (—OH), sulfo (—SO$_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl;
- $R_3$ is selected from the group consisting of a $C_1$-$C_{20}$ alkyl, a phenyl, an indanyl, and a napthyl, optionally comprising one or more heteroatoms (e.g. O, N or S) and optionally substituted with one or more substituents selected from the group consisting of halogen, hydroxy (—OH), sulfo (—SO$_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; and
- $R_4$ is selected from the group consisting of a linear or branched $C_6$-$C_{14}$ alkyl, optionally comprising one or more heteroatoms (e.g. O, N or S) and optionally substituted with one or more substituents selected from the group consisting of a halogen, hydroxy (—OH), sulfo (—SO$_3$M), $C_1$-$C_6$ alkoxy, $C_1$-$C_6$ alkylthio, $C_1$-$C_6$ acyl, formyl, cyano, and $C_6$-$C_{15}$ aryloxy and $C_6$-$C_{15}$ aryl; and
- M in each of $R_2$ to $R_4$ is independently selected from the group consisting of H, Na, K, Li, Ag, Zn, Mg and Ca;

with the provisos that
- if recurring unit Y is formed from the condensation of p-xylylene diamine and a $C_{12}$ dicarboxylic acid then:
  - 30 mol % ≤ $n_x$ ≤ 90 mol %;
  - 0 mol % ≤ $n_y$ ≤ 70 mol %; and
  - 0 mol % ≤ $n_z$ ≤ 70 mol %;
  - $n_x + n_y + n_z$ ≤ 100 mol. %; and
- If recurring unit Y is formed from the condensation of terephthalic acid with a diamine, $R_2$ is selected from the group consisting of a bond, a $C_1$-$C_9$ alkyl, a $C_{11}$-$C_{15}$ alkyl, and a $C_6$-$C_{30}$ aryl, optionally comprising one or more heteroatoms (e.g. O, N or S) and optionally substituted with one or more substituents selected from the group consisting of halogen, hydroxy (—OH), sulfo (—SO$_3$M), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl.

In some embodiments, recurring unit X is formed from the condensation of 4-aminomethylcyclohexanecarboxylic acid (1,4-AMCC).

According to an embodiment, the polyamide (PA) is an amorphous polyamide comprising a Tg from 50° C. to 190° C., preferably from 130° C. to 170° C.

According to an embodiment, the polyamide (PA) is semi-crystalline polyamide comprising a Tg 50° C. to 190° C., preferably from 60° C. to 170° C.

According to an embodiment, the polyamide (PA) comprises a melting temperature Tm of from 170° C. to 400° C.

The present invention also relates to an article comprising the polyamide of the invention or incorporating this polyamide (PA). The article may for example be selected in the group consisting of mobile phone, a personal digital assistant, a laptop computer, a tablet computer, a wearable computing device, a camera, a portable audio player, a portable radio, a global position system receiver, and a portable game console.

DISCLOSURE OF THE INVENTION

Described herein are polyamides (PA) including from 10 mole percent (mol. %) to 90 mol. % of a recurring unit (Rpm) derived from the condensation of a 1,4-cycloaliphatic amino acid (as described in detail below) as well as polymer compositions (C), including this polyamide and, optionally one or more additives. As used herein, mol. % is relative to the total number of moles of recurring units in polyamide (PA), unless explicitly noted otherwise. The polyamides (PA) of the present invention have improved glass transition temperatures ("Tg") and, for semi-crystalline polyamides (PA) have desirable melting temperatures ("Tm").

In the present application:
- any description, even though described in relation to a specific embodiment, is applicable to and interchangeable with other embodiments of the present disclosure;
- where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
- any recitation herein of numerical ranges by endpoints includes all numbers subsumed within the recited ranges as well as the endpoints of the range and equivalents.

The expression "at least" is hereby intended to denote "equals to or more than". For example, the expression "at least 10 mol. % of recurring units X" hereby denotes that the polyamide (PA) may comprise 10 mol. % of recurring units X or more than 10 mol. % of recurring units X. The expression "at least" therefore corresponds to the mathematical symbol "≥" in the context of the present invention.

The expression "less than" corresponds to the mathematical symbol "<" in the context of the present invention. For example, the expression "less than 90 mol. % of recurring units X" hereby denotes that the polyamide comprises strictly less than 90 mol. % of recurring units X and therefore qualify as a copolyamide, made from recurring units X and at least one another recurring unit X and/or Z.

All temperatures are given in degrees Celsius (° C.).

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

The term "aryl" refers to a phenyl, indanyl or naphthyl group. The aryl group may comprise one or more alkyl groups, and are called sometimes in this case "alkylaryl"; for example may be composed of an aromatic group and two $C_1$-$C_6$ groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

The expression "derivative thereof" when used in combination with the expression "dicarboxylic acid" is intended to denote whichever derivative which is susceptible of reacting in polycondensation conditions to yield an amide bond. Examples of amide-forming derivatives include a mono- or di-alkyl ester, such as a mono- or di-methyl, ethyl or propyl ester, of such carboxylic acid; a mono- or di-aryl ester thereof; a mono- or di-acid halide thereof; a carboxylic anhydride thereof and a mono- or di-acid amide thereof, a mono- or di-carboxylate salt.

The Polyamide (PA)

The present invention relates to a polyamide (PA) comprising recurring units X, Y, and Z and is represented by the following formula (1):

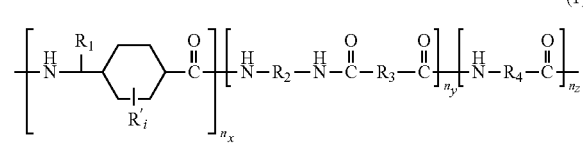

(1)

wherein
$n_x$, $n_y$ and $n_z$ are respectively the mole percent (mol. %) of each recurring units X, Y and Z;
10 mol % ≤ $n_x$ ≤ 90 mol %;
0 mol % ≤ $n_y$ ≤ 90 mol %;
0 mol % ≤ $n_z$ ≤ 90 mol %;
$n_x + n_y + n_z$ ≤ 100 mol %; and
at least one of $n_y$ and $n_z$ is greater than 0 mol %, and
wherein
$R_1$ is selected from the group consisting of a hydrogen, an alkyl, or an aryl
$R'_i$, at each location, is independently selected from the group consisting of an alkyl, an aryl, an alkali or alkaline earth metal sulfonate, an alkyl sulfonate, and a quaternary ammonium;

i is an integer from 0 to 10;
$R_2$ is selected from the group consisting of a bond, a $C_1$-$C_{15}$ alkyl and a $C_6$-$C_{30}$ aryl, optionally comprising one or more heteroatoms (e.g. O, N or S) and optionally substituted with one or more substituents selected from the group consisting of halogen, hydroxy (—OH), sulfo (—$SO_3M$), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl;
$R_3$ is selected from the group consisting of a $C_1$-$C_{20}$ alkyl, a phenyl, an indanyl, and a napthyl, optionally comprising one or more heteroatoms (e.g. O, N or S) and optionally substituted with one or more substituents selected from the group consisting of halogen, hydroxy (—OH), sulfo (—$SO_3M$), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; and
$R_4$ is selected from the group consisting of a linear or branched $C_6$-$C_{14}$ alkyl, optionally comprising one or more heteroatoms (e.g. O, N or S) and optionally substituted with one or more substituents selected from the group consisting of a halogen, hydroxy (—OH), sulfo (—$SO_3M$), $C_1$-$C_6$ alkoxy, $C_1$-$C_6$ alkylthio, $C_1$-$C_6$ acyl, formyl, cyano, and $C_6$-$C_{15}$ aryloxy and $C_6$-$C_{15}$ aryl; and
M in each of $R_2$ to $R_4$ is independently selected from the group consisting of H, Na, K, Li, Ag, Zn, Mg and Ca;
with the provisios that
if recurring unit Y is formed from the condensation of p-xylylene diamine and a $C_{12}$ dicarboxylic, preferably a $C_{12}$ aliphatic dicarboxylic acid, most preferably 1,12-diaminododecane, then:
30 mol % ≤ $n_x$ ≤ 90 mol %;
0 mol % ≤ $n_y$ ≤ 70 mol %; and
0 mol % ≤ $n_z$ ≤ 70 mol %;
$n_x + n_y + n_z$ ≤ 100 mol %; and
If recurring unit Y is formed from the condensation of terephthalic acid with a diamine, $R_2$ is selected from the group consisting of a bond, a $C_1$-$C_9$ alkyl, a $C_{11}$-$C_{15}$ alkyl, and a $C_6$-$C_{30}$ aryl, optionally comprising one or more heteroatoms (e.g. O, N or S) and optionally substituted with one or more substituents selected from the group consisting of halogen, hydroxy (—OH), sulfo (—$SO_3M$), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl.

Preferably $R_1$ and $R'_i$, at each location, are hydrogen (e.g. recurring unit X is formed from the condensation of 1,4-aminomethylcyclohexanecarboxylic acid (1,4-AMCC)). Furthermore, for clarity, in Formula (1) the left, center, and right recurring units are, respectively, recurring units X, Y and Z.

Referring to formula (1), $n_x + n_y + n_z$ ≤ 100 mol. %. Of course, in some embodiments, the polyamide (PA) can include additional recurring units, distinct from recurring units X, Y, and Z. In some such embodiments, $n_x + n_y + n_z$ is at least 50 mol %, at least 60 mol %, at least 70 mol %, at least 80 mol. %, at least 90 mol. %, at least 95 mol. %, at least 98 mol. %, at least 99 mol. %, at least 99.5 mol. %, or at least 99.9 mol. %. Alternatively, in some embodiments, $n_x + n_y + n_z = 100$ mol. %. The polyamide (PA) of the present invention may be composed of recurring units X and Y, of recurring units X and Z, or of recurring units X, Y and Z. Recurring units X, Y and Z are arranged in blocks, in alternation or randomly.

According to an embodiment, $n_x$ is from 10 mol. % to 90 mol. %. In some such embodiments, $n_x$ is at least 15 mol. %, at least 20 mol. %, at least 25 mol. %, or at least 30 mol. %. Additionally or alternatively, in some embodiments, $n_x$ is no more than 85 mol. %, no more than 80 mol. %, no more than 75 mol. %, no more than 70 mol. %, no more than 65 mol. %, no more than 60 mol. %, no more than 55 mol. % or no more than 50 mol. %. In some embodiments, $n_x$ is from 10 mol. % to 85 mol. %, from 10 mol. % to 80 mol. %, from 10 mol. % to 75 mol. %, from 10 mol. % to 70 mol. %, from 10 mol. % to 65 mol. %, from 10 mol. % to 60 mol. %, from 10 mol. % to 55 mol. % or from 10 mol. % to 50 mol. %. In some embodiments, $n_x$ is from 30 mol. % to 90 mol. %, from 30 mol. % to 85 mol. %, from 30 mol. % to 80 mol. %, from 30 mol. % to 75 mol. % or from 30 mol. % to 70 mol. %.

In some embodiments, $n_x$ is from 10 mol. % to 90 mol % and $n_y+n_z$ is, in total, from 10 mol. % to 90 mol %, preferably from 20 mol. % to 90 mol %, more preferably from 30 mol % to 90 mol %, still more preferably from 40 mol. % to 90 mol. %, and most preferably, from 50 mol. % to 70 mol. %. Of course, at least one of $n_y$ and $n_z$ is greater than zero however, in some embodiments, both $n_y$ and $n_z$ are greater than zero.

The polyamides (PA) of the present invention may have a number average molecular weight Mn ranging from 1,000 g/mol to 40,000 g/mol, for example from 2,000 g/mol to 35,000 g/mol, from 4,000 to 30,000 g/mol, or from 5,000 g/mol to 20,000 g/mol. The number average molecular weight Mn can be determined by gel permeation chromatography (GPC) using ASTM D5296 with polystyrene standards.

In the polyamide (PA) of the present disclosure, the recurring unit Y may be aliphatic or aromatic. For the purpose of the present invention, the expression "aromatic recurring unit" is intended to denote any recurring unit that comprises at least one aromatic group. The aromatic recurring units may be formed by the condensation of at least one aromatic dicarboxylic acid with an aliphatic diamine or by the condensation of at least one aliphatic dicarboxylic acid with an aromatic diamine. For the purpose of the present invention, a dicarboxylic acid or a diamine is considered as "aromatic" when it comprises one or more than one aromatic group. In the polyamide (PA) of the present disclosure, the recurring unit Z is aliphatic.

In some embodiments, the polyamide (PA) is free of recurring units formed from the condensation of p-xylylene diamine (PXDA) and a $C_{12}$ dicarboxylic acid, preferably a $C_{12}$ aliphatic dicarboxylic acid, most preferably dodecanedioic acid. As used herein, "free of" a recurring unit means that the polyamide (PA) comprises less than 20 mol. %, preferably less than 10 mol. %, more preferably less than 5 mol. %, still more preferably less than 2 mol. %, preferably less than 1 mol. %, more preferably less than 0.5 mol %, most preferably less than 0.1 mol. % the specified recurring unit (e.g. recurring units formed from the condensation of PXDA and a $C_{12}$ dicarboxylic acid). Alternatively, in some embodiments in which recurring unit Y is formed from the condensation of PXDA and a $C_{12}$ dicarboxylic acid (e.g. dodecanedioic acid), the polyamide (PA) comprises at least 30 mol. % of recurring unit Y, for example, from 30 mol. % to 90 mol. %, from 30 mol. % to 85 mol. %, from 30 mol. % to 80 mol. %, from 30 mol. % to 75 mol. % or from 30 mol. % to 70 mol. % of recurring unit Y. In some embodiments, the polyamide (PA) is free of recurring units formed from the condensation of a $C_{10}$ aliphatic diamine (e.g. 1,10-diaminodecane) and terephthalic acid.

According to an embodiment of the polyamide (PA), the polyamide (PA) is formed from the condensation of 1,4-AMCC (forming recurring unit X) and at least one of the components selected from the group consisting of:

at least one dicarboxylic acid component (also called hereby diacid) or derivative thereof, and at least one diamine component (forming recurring unit Y), at least one aminocarboxylic acid having 7 or more carbon atoms in the aminocarboxylic acid backbone (forming recurring unit Z), and at least one lactam having 7 or more carbon atoms in the lactam ring (forming recurring unit Z).

According to this embodiment, the dicarboxylic acid component can be chosen among a large variety of aliphatic or aromatic dicarboxylic acid components comprising at least two acidic moieties —COOH. According to this embodiment, the diamine component can be chosen among a large variety of aliphatic or aromatic components comprising at least two amine moieties —NH$_2$.

Non limitative examples of aliphatic dicarboxylic acid components are notably oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tridecanedioic acid [HOOC—(CH$_2$)$_{11}$—COOH], tetradecanedioic acid [HOOC—(CH$_2$)$_{12}$—COOH], pentadecanedioic acid [HOOC—(CH$_2$)$_{13}$—COOH], hexadecanedioic acid [HOOC—(CH$_2$)$_{14}$—COOH], octadecanedioic acid [HOOC—(CH$_2$)$_{16}$—COOH]. Included in this category are also cycloaliphatic dicarboxylic acids such as 1,4-cyclohexane dicarboxylic acid (CHDA).

Non limitative examples of aromatic dicarboxylic acid components are notably phthalic acids, including isophthalic acid (IA), terephthalic acid (TA), naphthalenedicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, 2,2-bis(3-carboxyphenyl)hexafluoropropane, 2,2-bis(3-carboxyphenyl)ketone, bis(3-carboxyphenoxy)benzene.

Non limitative examples of aromatic diamine components are notably m-phenylene diamine (MPD), p-phenylene diamine (PPD), 3,4'-diaminodiphenyl ether (3,4'-ODA), 4,4'-diaminodiphenyl ether (4,4'-ODA), p-xylylene diamine (PXDA) and m-xylylenediamine (MXDA).

Non limitative examples of aliphatic diamine components are notably 1,2-diaminoethane, 1,2-diaminopropane, propylene-1,3-diamine, 1,3-diaminobutane, 1,4-diaminobutane (putrescine), 1,5-diaminopentane (cadaverine), 2-methyl-1,5-diaminopentane, hexamethylenediamine (or 1,6-diaminohexane), 3-methylhexamethylenediamine, 2,5-dimethylhexamethylenediamine, 2,2,4-trimethylhexamethylenediamine, 2,4,4-trimethylhexamethylenediamine, 1,7-diaminoheptane, 1,8-diaminooctane, 2,2,7,7-tetramethyloctamethylenediamine, 1,9-diaminononane, 2-methyl-1,8-diaminooctane, 5-methyl-1,9-diaminononane, 1,10-diaminodecane, 1,11-diaminoundecane, 1,12-diaminododecane, 1,13-diaminotridecane, 2,5-diamonotetrahydrofurane and N,N-Bis(3-aminopropyl)methylamine. Included in this category are also cycloaliphatic diamine such as isophorone diamine, 1,3- diaminocyclohexane, 1,4-diaminocyclohexane, bis-p-aminocyclohexylmethane, 1,3-bis(aminomethyl)cyclohexane, 1,4-bis(aminomethyl)cyclohexane, bis(4-amino-3-methylcyclohexyl) methane and bis(4-aminocyclohexyl)methane.

The aliphatic diamine component can also be selected in the group of polyetherdiamines. The polyetherdiamines can be based on an ethoxylated (EO) backbone and/or on a propoxylated (PO) backbone and they can be ethylene-oxide terminated, propylene-oxide terminated or butylene-oxide terminated diamines. Such polyetherdiamines are for example sold under the trade name Jeffamine® and Elastamine® (Hunstman).

The aminocarboxylic acid has at least 7 carbon atoms in the aminocarboxylic acid backbone, for example, from 7 to 15 carbon atoms or from 7 to 13 carbon atoms, in the aminocarboxylic acid backbone. According to an embodiment, the aminocarboxylic acid is selected from the group consisting of 9-aminononanoic acid, 10-aminodecanoic acid, 11-aminoundecanoic acid, 12-aminododecanoic acid, 13-aminotridecanoic acid. The lactam has at least 7 carbon atoms in the lactam ring, for example, from 7 to 15 carbon atoms or from 7 to 13 carbon atoms, in the lactam ring. According to an embodiment, the lactam is laurolactam.

According to an embodiment, the polyamide (PA) comprises from 10 mol. % to 90 mol. % of recurring unit X and
recurring unit Y, where recurring unit Y is formed from the condensation of a:
a dicarboxylic acid component selected from the group consisting of adipic acid, azelaic acid, sebacic acid, dodecanedioic acid, isophthalic acid, terephthalic acid, 2,6-naphthalene dicarboxylic acid, 4,4'-bibenzoic acid, 5-hydroxyisophthalic acid, 5-sulfophthalic acid, 1,4-cyclohexanedicarboxylic acid and mixture thereof, and
a diamine component selected from the group consisting of 1,4-diaminobutane, 1,5-diamonopentane, 2-methyl-1,5diaminopentane, hexamethylenediamine, 1,9-diaminononane, 2-methyl-1,8-diaminooctoane, 1,10-diaminodecane, 1,12-diaminododecane, $H_2N-(CH_2)_3-O-(CH_2)_2-O(CH_2)_3-NH_2$, m-xylylene diamine, p-xylylene diamine, bis(4-aminocyclohexyl)methane, 1,4-cyclohexane dicarboxylic acid and mixture thereof, with the provisios:
if the diamine component is p-xylylene diamine and the dicarboxylic acid component is dodecanedioic acid then:
30 mol %≤$n_x$≤90 mol %;
0 mol %≤$n_y$≤70 mol %; and
0 mol %≤$n_z$≤70 mol %;
$n_x+n_y+n_z$≤100 mol. %; and
If the dicarboxylic acid component is terephthalic acid, the diamine component is selected from the group consisting 1,4-diaminobutane, 1,5-diaminopentane, 2-methyl-1,5diaminopentane, hexamethylenediamine, 1,9-diaminononane, 2-methyl-1,8-diaminooctane, 1,12-diaminododecane, $H_2N-(CH_2)_3-O-(CH_2)_2-O(CH_2)_3-NH_2$, m-xylylene diamine, p-xylylene diamine, bis(4-aminocyclohexyl)methane and mixture thereof.

In some such embodiments, the dicarboxylic acid component is selected from the group consisting of adipic acid, sebacic acid, terephthalic acid, isophthalic acid, 1,4-cyclohexanedicarboxylic acid and mixture thereof, preferably adipic acid, terephthalic acid, 1,4-cyclohexanedicarboxylic acid and mixtures thereof; and the diamine component is selected from the group consisting of hexamethylenediamine, m-xylylene diamine, 1,10-diaminodecane, 1,12-diaminododecane, and mixture thereof, with the proviso that If the dicarboxylic acid component is terephthalic acid, the diamine component is selected from the group consisting of hexamethylenediamine, m-xylylene diamine, 1,12-diaminododecane, and mixture thereof. In further such embodiments, the dicarboxylic acid component is selected from the group consisting of adipic acid, terephthalic acid, isophthalic acid, 1,4-cyclohexanedicarboxylic acid and mixture thereof, and the diamine component is selected from the group consisting of hexamethylenediamine, 1,12-diaminododecane, and mixture thereof.

According to another embodiment, the polyamide (PA) comprises from 10 mol. % to 90 mol. % of recurring unit X and
recurring unit Z, formed from the condensation of at least one lactam or aminocarboxylic acid, wherein the lactam is laurolactam and the aminocarboxylic acid is 11-aminoundecanoic acid, and mixture thereof.

Referring to formula (1), as an example of the different embodiments of the present invention, if the polyamide (PA) of the present invention is composed exclusively of recurring units x and y, then $n_x+n_y$=100% and $n_z$=0. In this case, the recurring unit y is composed of a diamine component and a dicarboxylic acid component; the number of moles of diamines and the number of moles of diacids to be added to the condensation reaction are equal. For example, if the polyamide (PA) is composed exclusively of recurring units derived from the condensation of 1,4-AMCC (recurring unit X), as well as recurring units derived from the condensation of terephthalic acid and hexamethylenediamine (recurring unit Y), with $n_x$=60 mol. % and $n_y$=40 mol. %, then substantially the same number of moles of terephthalic acid and hexamethylenediamine should be added to the condensation mixture, that is to say 40 mol. %. The term "substantially" is hereby intended to denote that the ratio diacid/diamine varies between 0.9 to 1.1, for example between 0.95 and 1.05.

The polyamide (PA) of the present invention can be amorphous of semi-crystalline. As used herein, a semi-crystalline polyamide comprises a heat of fusion ($\Delta H_f$) of at least 5 joules per gram (J/g) at a heating rate of 20 C/min. Similarly, as used herein, an amorphous polyamide comprises a $\Delta H_f$ of less than 5 J/g at a heating rate of 20 C/min. $\Delta H_f$ can be measured according to ASTM D3418.

In some embodiments, the polyamide (PA) has a Tg of at least 50° C., at least 60° C., at least 100° C., at least 120° C., at least 130° C., or at least 140° C. Additionally or alternatively, in some embodiment, the polyamide (PA) has a Tg of no more than 190° C., no more than 180° C., no more than 170° C., or no more than 165° C. In some embodiments, the polyamide (PA) has a Tg of from 50° C. to 190° C., from 60° C. to 190° C., from 100° C. to 190° C., from 110° C. to 190° C., 120° C. to 190° C., from 130° C. to 180° C., from 130° C. to 170° C., from 140° C. to 170° C., from 145° C. to 170° C., or from 145° C. to 165° C. Preferably, for amorphous polyamides (PA), the Tg is from 130° C. to 170° C. and for semi-crystalline polyamides (PA) is from 60° C. to 170° C. Tg can be measured according to ASTM D3418.

In some embodiments in which the polyamide (PA) is a semi-crystalline polyamide, the polyamide (PA) has a Tm of at least 170° C., at least 190° C., at least 200° C., at least 210° C., at least 220° C., at least 230° C., at least 240° C., or at least 250° C. Additionally or alternatively, in some embodiments in which the polyamide (PA) is a semi-crystalline polyamide, the polyamide (PA) has a Tm of no more than 400° C., no more than 390° C., no more than 380° C., no more than 370° C., no more than 360° C., or no more than 350° C. In some embodiments in which the polyamide (PA) is a semi-crystalline polyamide, the polyamide (PA) has a Tm of from 170° C. to 400° C., from 190° C. to 400° C., from 200° C. to 400° C., from 210° C. to 390° C., from 220° C. to 380° C., from 230° C. to 370° C., from 240° C. to 360° C. or from 250° C. to 350° C. Tm can be measured according to ASTM D3418.

The polyamide (PA) described herein can be prepared by any conventional method adapted to the synthesis of polyamides and polyphthalamides.

Preferentially, the polyamide of the invention is prepared by reacting by heating the monomers in presence of less than 60 wt. % of water, preferentially less than 30 wt. %, less than 20 wt. %, less than 10 wt. %, preferentially with no added water, up to a temperature of at least Tm+10° C., Tm being the melting temperature of the polyamide for a semi-crystalline polyamide, or at least Tg+50 C, Tg being the glass transition temperature of the polyamide for an amorphous polyamide The polyamide (PA) described herein can for example be prepared by thermal polycondensation (also referred to as polycondensation or condensation) of aqueous solution of monomers and comonomers. The polyamides may contain a chain limiter, which is a monofunctional molecule capable of reacting with the amine or carboxylic acid moiety, and is used to control the molecular weight of the polyamide. For example, the chain limiter can be acetic acid, propionic acid, benzoic acid and/or benzylamine. A catalyst can also be used. Examples of catalyst are phosphorous acid, orthophosphoric acid, meta-phosphoric acid, alkali-metal hypophosphite such as sodium hypophosphite and phenylphosphinic acid. A stabilizer, such as a phosphite, may also be used.

The polyamide (PA) described herein can also advantageously be prepared by a solvent-free process, that-is-to-say a process conducted in the melt, in the absence of a solvent. When the condensation is solvent-free, the reaction can be carried out in equipment made from materials inert toward the monomers. In this case, the equipment is chosen in order to provide enough contact of the monomers, and in which the removal of volatile reaction products is feasible. Suitable equipment includes agitated reactors, extruders and kneaders.

Polymer Composition (C)

The polymer composition (C) comprises the polyamide (PA) of the present invention, above described.

The polyamide (PA) may be present in the composition (C) in a total amount of greater than 30 wt. %, greater than 35 wt. % by weight, greater than 40 wt. % or greater than 45 wt. %, based on the total weight of the polymer composition (C).

The polyamide (PA) may be present in the composition (C) in a total amount of less than 99.95 wt. %, less than 99 wt. %, less than 95 wt. %, less than 90 wt. %, less than 80 wt. %, less than 70 wt. % or less than 60 wt. %, based on the total weight of the polymer composition (C).

The polyamide (PA) may for example be present in the composition (C) in an amount ranging between 35 and 60 wt. %, for example between 40 and 55 wt. %, based on the total weight of the polymer composition (C).

The composition (C) may also comprise one component selected from the group consisting of reinforcing agents, tougheners, plasticizers, colorants, pigments, antistatic agents, dyes, lubricants, thermal stabilizers, light stabilizers, flame retardants, nucleating agents and antioxidants.

A large selection of reinforcing agents, also called reinforcing fibers or fillers, may be added to the composition according to the present invention. They can be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50. In some embodiments, the reinforcing fibers (e.g. glass fibers or carbon fibers) have an average length of from 3 mm to 50 mm. In some such embodiments, the reinforcing fibers have an average length of from 3 mm to 10 mm, from 3 mm to 8 mm, from 3 mm to 6 mm, or from 3 mm to 5 mm. In alternative embodiments, the reinforcing fibers have an average length of from 10 mm to 50 mm, from 10 mm to 45 mm, from 10 mm to 35 mm, from 10 mm to 30 mm, from 10 mm to 25 mm or from 15 mm to 25 mm. The average length of the reinforcing fibers can be taken as the average length of the reinforcing fibers prior to incorporation into the polymer composition (C) or can be taken as the average length of the reinforcing fiber in the polymer composition (C).

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 15 wt. %, greater than 20 wt. % by weight, greater than 25 wt. % or greater than 30 wt. %, based on the total weight of the polymer composition (C). The reinforcing agents may be present in the composition (C) in a total amount of less than 65 wt. %, less than 60 wt. %, less than 55 wt. % or less than 50 wt. %, based on the total weight of the polymer composition (C).

The reinforcing filler may for example be present in the composition (C) in an amount ranging between 20 and 60 wt. %, for example between 30 and 50 wt. %, based on the total weight of the polymer composition (C).

The composition (C) of the present invention may also comprise a toughener. A toughener is generally a low glass transition temperature ($T_g$) polymer, with a $T_g$ for example below room temperature, below 0° C. or even below −25° C. As a result of its low $T_g$, the toughener are typically elastomeric at room temperature. Tougheners can be functionalized polymer backbones.

The polymer backbone of the toughener can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further component.

Specific examples of functionalized tougheners are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride.

The toughener may be present in the composition (C) in a total amount of greater than 1 wt. %, greater than 2 wt. % or greater than 3 wt. %, based on the total weight of the composition (C). The toughener may be present in the composition (C) in a total amount of less than 30 wt. %, less than 20 wt. %, less than 15 wt. % or less than 10 wt. %, based on the total weight of the polymer composition (C).

The composition (C) may also comprise other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The composition (C) may also comprise one or more other polymers, preferably polyamides different from the polyamide (PA) of the present invention. Mention can be made notably of semi-crystalline or amorphous polyamides, such as aliphatic polyamides, semi-aromatic polyamides, and more generally the polyamides obtained by polycondensation between an aromatic or aliphatic saturated diacid and an aliphatic saturated or aromatic primary diamine, a lactam, an amino-acid or a mixture of these different monomers.

Preparation of the Polymer Composition (C)

The invention further pertains to a method of making the composition (C) as above detailed, said method comprising melt-blending the polyamide (PA) and the specific components, e.g. a filler, a toughener, a stabilizer, and of any other optional additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Articles and Applications

The present invention also relates to articles comprising the polyamide (PA) of the present invention and to articles comprising the copolymer composition (C) described above.

The article can notably be used in mobile electronics, LED packaging, oil and gas applications, food contact applications, electrical applications, medical device parts, construction applications, industrial applications, plumbing parts, automotive parts, and aerospace parts.

The article can, for example, be a mobile electronic device component. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch, smart glasses and the like), a camera, a portable audio player, a portable radio, global position system receivers, and portable game consoles.

The mobile electronic device component may, for example, comprise a radio antenna and the composition (C). In this case, the radio antenna can be a WiFi antenna or an RFID antenna. The mobile electronic device component may also be an antenna housing.

In some embodiments, the mobile electronic device component is an antenna housing. In some such embodiments, at least a portion of the radio antenna is disposed on the polymer composition (C). Additionally or alternatively, at least a portion of the radio antenna can be displaced from the polymer composition (C). In some embodiments, the device component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

Examples of electric and electronics devices are connectors, contactors and switches.

The polyamide (PA), polymer composition (C) and article prepared therefrom may also be used as a gas barrier material for packaging applications, in mono or multilayer articles.

The polyamide (PA), polymer composition (C) and article prepared therefrom can also be used in automotive applications, for example in air induction systems, cooling and heating systems, drivetrain systems and fuel systems.

The article can be molded from the polyamide (PA) or polymer composition (C) of the present invention, by any process adapted to thermoplastics, e.g. extrusion, injection molding, blow molding, rotomolding or compression molding.

The article can be printed from the polyamide (PA) or polymer composition (C) of the present invention, by a process comprising a step of extrusion of the material, which is for example in the form of a filament, or comprising a step of laser sintering of the material, which is in this case in the form of a powder.

The present invention also relates to a method for manufacturing a three-dimensional (3D) object with an additive manufacturing system, comprising:

providing a part material comprising the polyamide (PA) or polymer composition (C) of the present invention, and printing layers of the three-dimensional object from the part material.

The polyamide (PA) or polymer composition (C) can therefore be in the form of a thread or a filament to be used in a process of 3D printing, e.g. Fused Filament Fabrication, also known as Fused Deposition Modelling (FDM).

The polyamide (PA) or polymer composition (C) can also be in the form of a powder, for example a substantially spherical powder, to be used in a process of 3D printing, e.g. Selective Laser Sintering (SLS).

Use of the Polyamides (PA), Composition (C) and Articles

The present invention relates to the use of the above-described polyamides (PA), composition (C) or articles for manufacturing a mobile electronic device component, as described above.

The present invention also relates to the use of the above-described polyamides (PA) or composition (C) for 3D printing an object.

Should the disclosure of any patents, patent applications, and publications which are incorporated herein by reference conflict with the description of the present application to the extent that it may render a term unclear, the present description shall take precedence.

EXAMPLES

These examples demonstrate the thermal, dielectric and mechanical performances of several inventive or comparative polyamides.

Raw Materials

Trans-1,4-AMCC: obtained from Sigma-Aldrich
Hexamethylenediamine (70 wt. %): obtained from Ascend Performance Materials
1,12-diaminododecane: obtained from Invista
Adipic Acid: obtained from Ascend Performance Materials
Sebacic Acid: obtained from Sigma-Aldrich
Isophthalic Acid: obtained from Flint Hilss Resources
1,4-Cyclohexane Dicarboxylic Acid: obtained from Eastman Chemical
Terephthalic Acid: Flint Hills Resources
Isophthalic Acid: Flint Hills Resources Polyamides Preparation Synthesis of E1-E3: The molar equivalent amounts of 1,4-AMCC, hexamethylenediamine and isophthalic acid were charged into the agitated reactor and added with DI water (35 wt %). Phosphorus acid (120 ppm equivalent P) was used as an additive in the polymerization. The mixture was heated to 335° C. The steam generated was released and the reacting mixture was further heated at this temperature for another 60 minutes at ambient pressure. Vacuum was applied for 10 minutes before the heating was turned off. The formed polymer was discharged and analyzed for their thermal properties.

Synthesis of E4: Similar process as for PA E1-E3 was followed to make PA E4 but, instead of isophthalic acid, equivalent molar amount of adipic acid was used.

Synthesis of E5: Similar process as for PA E1-E3 was followed to make PA E5 but, instead of hexamethylenediamine and isophthalic acid, equivalent molar amounts of dodecamethylenediamine and adipic acid were used.

Synthesis of E6: Similar process as for PA E1-E3 was followed to make PA E6 but, instead of hexamethylenediamine, equivalent molar amount of dodecamethylenediamine was used.

Synthesis of E7: Similar process as for PA E1-E3 was followed to make PA E7 but, instead of hexamethylenediamine and isophthalic acid, equivalent molar amounts of dodecamethylenediamine and 1,4-cyclohexane dicarboxylic acid were used.

Synthesis of E8: Similar process as for PA E1-E3 was followed to make PA E8 but, instead of isophthalic acid, equivalent molar amount of terephthalic acid was used.

Testing

Thermal Transitions (Tg, Tm)

The glass transition and melting temperatures of the various polyamides were measured using differential scanning calorimetry according to ASTM D3418 employing a heating and cooling rate of 20° C./min. Three scans were used for each DSC test: a first heat up to 340° C., followed by a first cool down to 30° C., followed by a second heat up to 350° C. The Tg and the Tm were determined from the second heat up. The glass transition and melting temperatures are tabulated in Table 1 below. In Table 1, Tg and Tm for counterexample CE1 was obtained from U.S. Pat. No. 3,509,105 to Pedersen, issued Apr. 28, 1970; and for counter examples C2 and C3 were obtained from Ellis, Bryan Smith, Ray. (2009). Polymers—A Property Database (2nd Edition), Taylor & Francis, all of which are herein incorporated by reference. Additionally, in Table 1, CHDA refers to 1,4-cyclohexanedicarboxylic acid.

| Example Number | Polyamide (Molar Ratio) | Tg (° C.) | Tm (° C.) | $\Delta H_f$ (J/g) | Intrinsic Viscosity (dL/g) |
|---|---|---|---|---|---|
| E1 | PA 1,4-AMCC/6,I (20/80) | 135 | — | — | 1.30 |
| E2 | PA 1,4-AMCC/6,I (42/58) | 157 | — | — | 1.16 |
| E3 | PA 1,4-AMCC/6,I (60/40) | 158 | — | — | 0.77 |
| E4 | PA 1,4-AMCC/6,6 (40/60) | 79 | 204 | 28 | 0.85 |
| E5 | PA 1,4-AMCC/12,6 (40/60) | 61 | 179 | 7 | 0.56 |
| E6 | PA 1,4-AMCC/12,I (40/60) | 110 | — | — | 0.96 |
| E7 | PA 1,4-AMCC/12,CHDA (40/60) | 163 | 271 | 35 | 0.72 |
| E8 | PA 1,4-AMCC/6,T (40/60) | 160 | 296 | 28 | 1.37 |
| CE1 | PA 1,4-AMCC (100) | — | >370 | — | — |
| CE2 | PA 6,6 (100) | 60 | 265 | — | — |
| CE3 | PA6,I | 130 | — | — | — |

Comparison of examples E2-E4 with counter examples CE1-CE3 demonstrates the tunability of the Tg of the polyamides (PA). CE1 (homopolymer formed from condensation of 1,4-AMCC) has a Tm in excess of 370° C., which can make melt processing difficult. CE2 (homopolymer formed from the condensation of hexamethylamine diamine and adipic acid), while having a Tm of 265° C., has a Tg of only 60° C. On the other hand, E4 has a significantly increased Tg relative to CE2 and significantly reduced Tm relative to CE1. Additionally, comparison of E2 and E3 with CE3 demonstrates that E2 and E3 has significantly increased Tg, relative to CE3.

Amorphous copolyamides of example E1, E2, E3 exhibit a significantly higher Tg than polyamide PA 6I, even when as low as 20 mol % of AMCC is used. It is important for applications that require high level of mechanical strength in hot environment.

The invention claimed is:

1. A polyamide comprising recurring units X and Y and represented by the following formula (1):

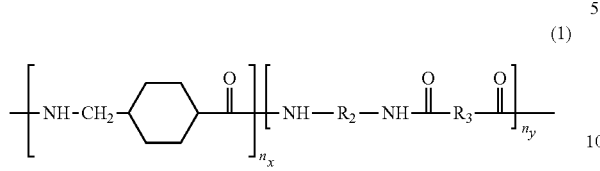

(1)

wherein
$n_x$ and $n_y$ are respectively the mole percent (mol %) of each recurring unit X and Y;
15 mol % ≤ $n_x$ ≤ 90 mol %;
5 mol % ≤ $n_y$ ≤ 90 mol %;
95 mol % ≤ $n_x + n_y$ ≤ 100 mol %; and
wherein
$R_2$ is selected from the group consisting of a $C_1$-$C_{15}$ alkylene and a $C_6$-$C_{30}$ arylene;
$R_3$ is selected from the group consisting of a $C_1$-$C_{20}$ alkylene, a phenylene, an indenylene, and a naphthylene;
with the provisos that
if recurring unit Y is formed from the condensation of p-xylylene diamine and a $C_{12}$ dicarboxylic acid then:
30 mol % ≤ $n_x$ ≤ 90 mol %;
5 mol % ≤ $n_y$ ≤ 70 mol %;
$n_x + n_y$ ≤ 100 mol %; and
if recurring unit Y is formed from the condensation of terephthalic acid with a diamine, $R_2$ is selected from the group consisting of a $C_1$-$C_9$ alkylene, a $C_{11}$-$C_{15}$ alkylene, and a $C_6$-$C_{30}$ arylene.

2. The polyamide of claim 1, wherein recurring unit X is formed from the condensation of 1,4-aminomethylcyclohexanecarboxylic acid.

3. The polyamide of claim 2, wherein the polyamide is free of recurring units formed from the condensation of p-xylylene diamine and a $C_{12}$ dicarboxylic acid.

4. The polyamide of claim 1, wherein recurring unit Y is formed from the condensation of a dicarboxylic acid component and a diamine component and wherein:
the dicarboxylic acid component is selected from the group consisting of adipic acid, azelaic acid, sebacic acid, isophthalic acid, terephthalic acid, 2,6-naphthalene dicarboxylic acid, 4,4'-bibenzoic acid, 5-hydroxyisophthalic acid, 5-sulfophthalic acid, 1,4-cyclohexanedicarboxylic acid and mixture thereof, and
the diamine component is selected from the group consisting of 1,4-diaminobutane, 1,5-diaminopentane, 2-methyl-1,5-diaminopentane, hexamethylenediamine, 1,9-diaminononane, 2-methyl-1,8-diaminooctoane, 1,10-diaminodecane, 1,12-diaminododecane, $H_2N$—$(CH_2)_3$—O—$(CH_2)_2$—O$(CH_2)_3$—$NH_2$, bis(4-amino-3-methylcyclohexyl)methane, m-xylylene diamine, p-xylylene diamine, bis(4-aminocyclohexyl)methane, and mixture thereof.

5. The polyamide of claim 1, wherein recurring unit Y is formed from the condensation of a dicarboxylic acid component and a diamine component, and wherein:
the dicarboxylic acid component is selected from the group consisting of adipic acid, sebacic acid, isophthalic acid, terephthalic acid, 1,4-cyclohexanedicarboxylic acid and mixtures thereof; and
the diamine component is selected from the group consisting of hexamethylenediamine, 1,12-diaminododecane and mixtures thereof.

6. The polyamide of claim 1, wherein the polyamide is an amorphous polyamide comprising a Tg from 50° C. to 190° C.

7. The polyamide of claim 1, wherein the polyamide is a semi-crystalline polyamide comprising a Tg from 60° C. to 170° C.

8. The polyamide of claim 1, wherein the polyamide has a melting temperature of from 170° C. to 400° C.

9. A polymer composition, comprising:
the polyamide of claim 1, and
at least one component selected from the group consisting of reinforcing agents, tougheners, plasticizers, colorants, pigments, antistatic agents, dyes, lubricants, thermal stabilizers, light stabilizers, flame retardants, nucleating agents and antioxidants.

10. The polymer composition of claim 9, wherein the at least one component is a reinforcing agent of a reinforcing fiber having an average length of from 3 mm to 50 mm.

11. The polymer composition of claim 9, wherein the at least one component is a reinforcing agent from 10 wt. % to 60 wt. % of glass fibers, based on the total weight of the composition.

12. The polymer composition of claim 9, comprising from 40 wt. % to 70 wt. % of the polyamide.

13. An article comprising the polymer composition of claim 9, wherein the article is a mobile electronic device or component thereof, a composite material or a 3D printed article.

14. The article of claim 13, wherein the article is a mobile electronic device or component thereof, and the mobile electronic device is selected from the group consisting of a mobile phone, a personal digital assistant, a laptop computer, a tablet computer, a wearable computing device, a camera, a portable audio player, a portable radio, a global position system receiver, and a portable game console.

* * * * *